(12) United States Patent
Mizushima et al.

(10) Patent No.: US 7,242,439 B2
(45) Date of Patent: Jul. 10, 2007

(54) TELEVISION RECEIVER AND ELECTRIC APPARATUS CONTROL METHOD

(75) Inventors: Yoshinori Mizushima, Takefu (JP); Tetsuo Tsurusaki, Takefu (JP)

(73) Assignee: Orion Electric Company Ltd., Fukui-ken (JP)

( * ) Notice: Subject to any disclaimer, the term of this patent is extended or adjusted under 35 U.S.C. 154(b) by 450 days.

(21) Appl. No.: 10/843,581

(22) Filed: May 12, 2004

(65) Prior Publication Data

US 2004/0227857 A1 Nov. 18, 2004

(30) Foreign Application Priority Data

May 13, 2003 (JP) ............................ 2003-133983

(51) Int. Cl.
*H04N 5/44* (2006.01)
(52) U.S. Cl. ...................... 348/734; 348/552; 348/553
(58) Field of Classification Search ................ 348/734, 348/552, 553, 554; 340/825.69, 825.72, 340/7.39; *H04N 5/44*
See application file for complete search history.

(56) References Cited

U.S. PATENT DOCUMENTS

| 5,629,868 A * | 5/1997 | Tessier et al. .............. 348/164 |
| 6,407,779 B1 * | 6/2002 | Herz ........................... 348/734 |
| 6,469,633 B1 * | 10/2002 | Wachter ................. 340/825.69 |
| 6,526,579 B2 * | 2/2003 | Sato ............................ 725/58 |
| 6,567,011 B1 * | 5/2003 | Young et al. .......... 340/825.69 |
| 7,038,738 B2 * | 5/2006 | Kwon ........................ 348/734 |

FOREIGN PATENT DOCUMENTS

| JP | 05-227574 | 2/1992 |
| JP | 2002-238001 | 10/1993 |
| JP | 08-223661 | 2/1995 |
| JP | 10-174078 | 12/1996 |
| JP | 2002-186067 | 12/2000 |

* cited by examiner

*Primary Examiner*—Trang Tran
(74) *Attorney, Agent, or Firm*—Reed Smith LLP; Stanley P. Fisher, Esq.; Juan Carlos A. Marquez, Esq.

(57) ABSTRACT

An object of this invention is to control operations of electric apparatuses other than a television receiver successively with an operation of the television receiver. The television receiver 1 includes an other-apparatus-code storage section 15, a successive control section 12, an other-apparatus-code output processing section 17, a transmission section 3, and a successive operation definition unit for making a specific operation of the television receiver 1 and specific operations of the other electric apparatuses correspond to one another in advance. The other-apparatus-code storage section 15 stores control codes for the other electric apparatuses. Successively with the specific operation of the television receiver 1, the control codes for the other electric apparatuses made to correspond to the specific operation of the television receiver 1 by the successive operation definition means are read from the other-apparatus-code storage section 15 into the successive control section 12, and the control codes are output to the other-apparatus-code output processing section 17. The other-apparatus-code output processing section 17 carries out a processing for transmitting by radio the control codes input from the successive control section 12, and causes the transmission section 3 to transmit the processed control codes to the other electric apparatuses.

7 Claims, 9 Drawing Sheets

[Fig. 1]
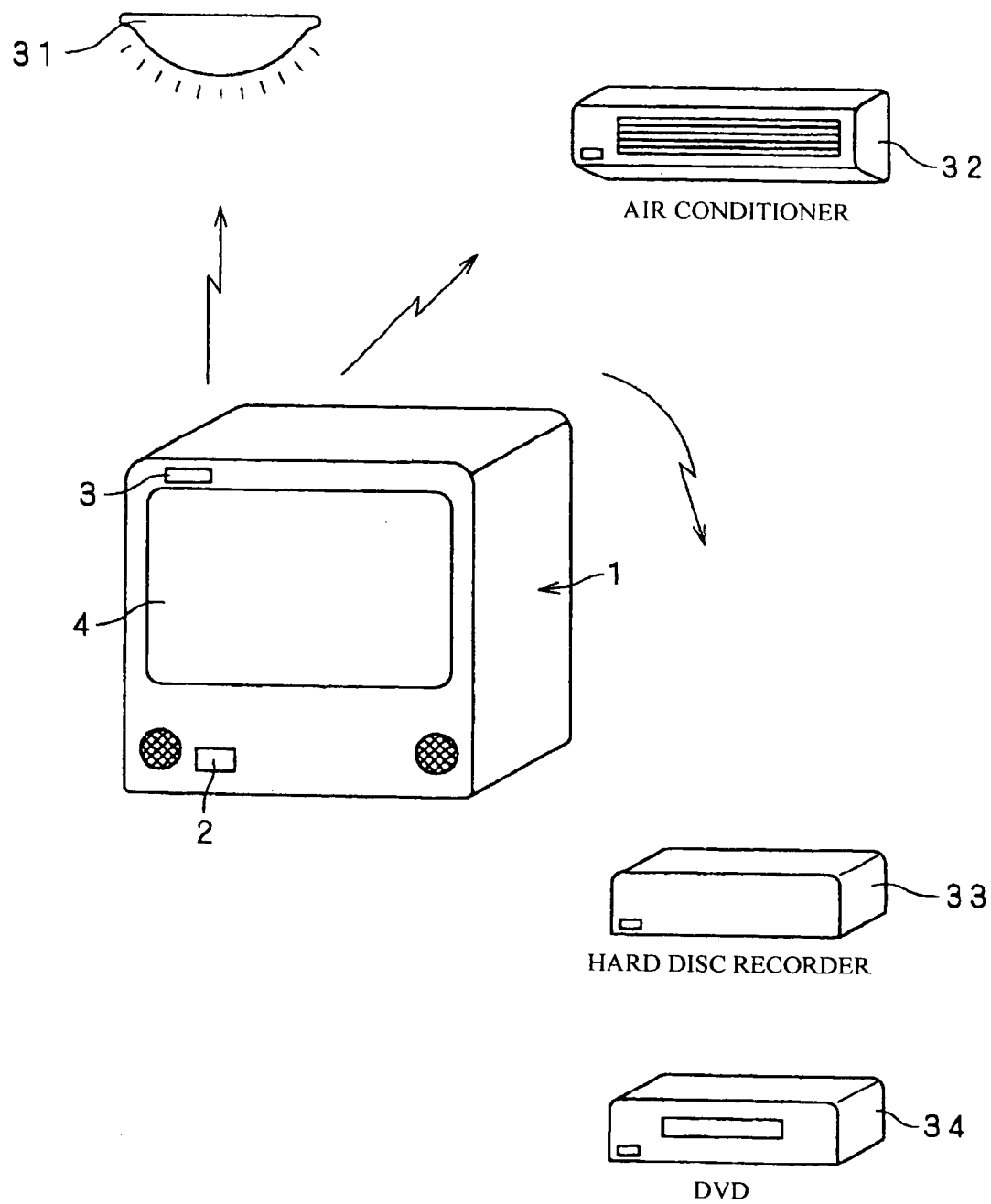

[Fig. 2]
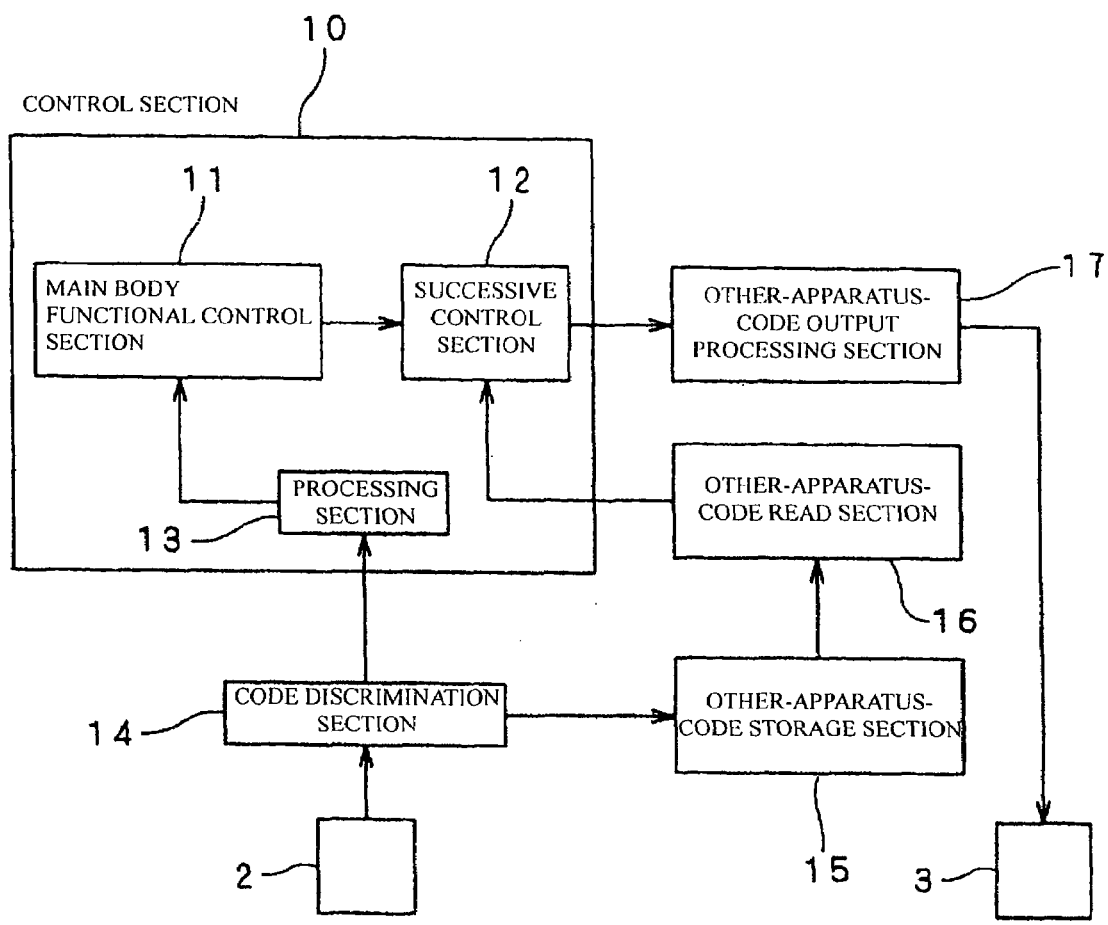

[Fig. 3]

| APPARATUSES | CODE | FUNCTION | | CODE |
|---|---|---|---|---|
| FIRST AIR CONDITIONER | 20H | POWER | ON | 7A |
| | | POWER | OFF | 8A |
| | | • | | |
| | | • | | |
| | | • | | |
| SECOND AIR CONDITIONER | 21H | POWER | ON | 1A |
| | | POWER | OFF | 2A |
| | | • | | |
| | | • | | |
| | | • | | |
| HARD DISC | 50H | REPRODUCTION | | 1B |
| | | POWER | ON | 4B |
| | | POWER | OFF | 5B |
| | | • | | |
| | | • | | |
| | | • | | |
| ILLUMINATING LAMP | 10H | | | |
| • | | | | |
| • | | | | |
| • | | | | |

[Fig. 4]
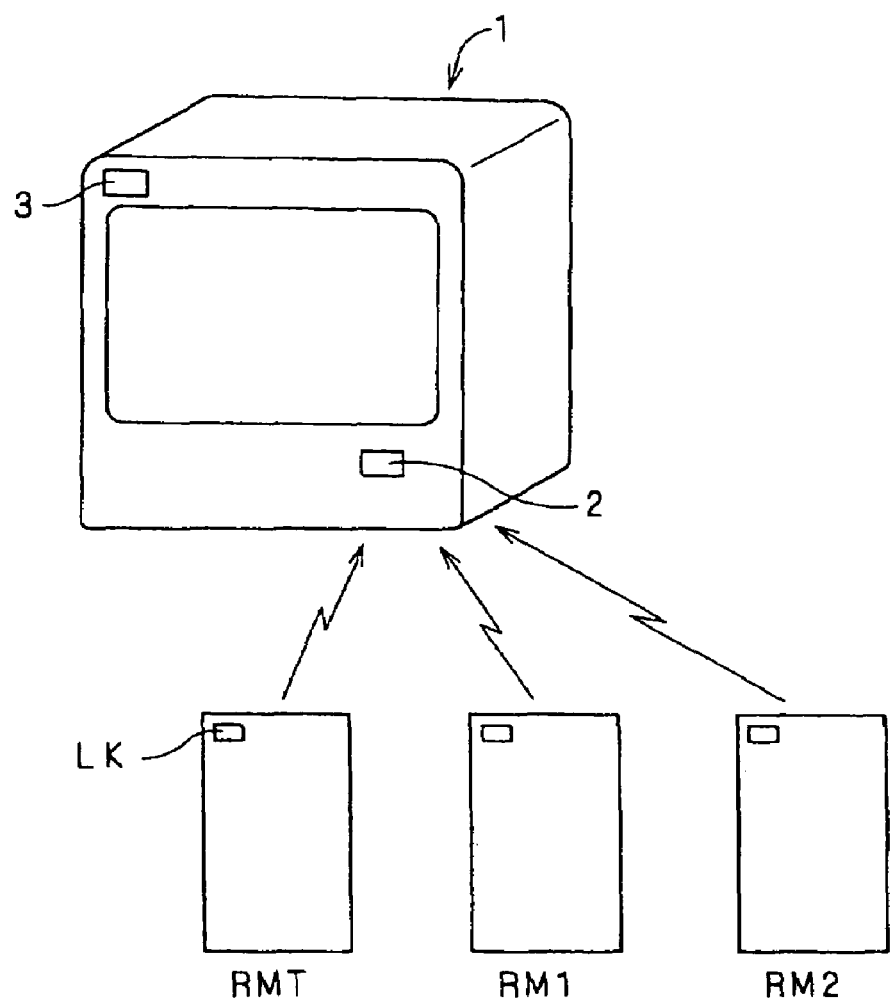

[Fig. 5]
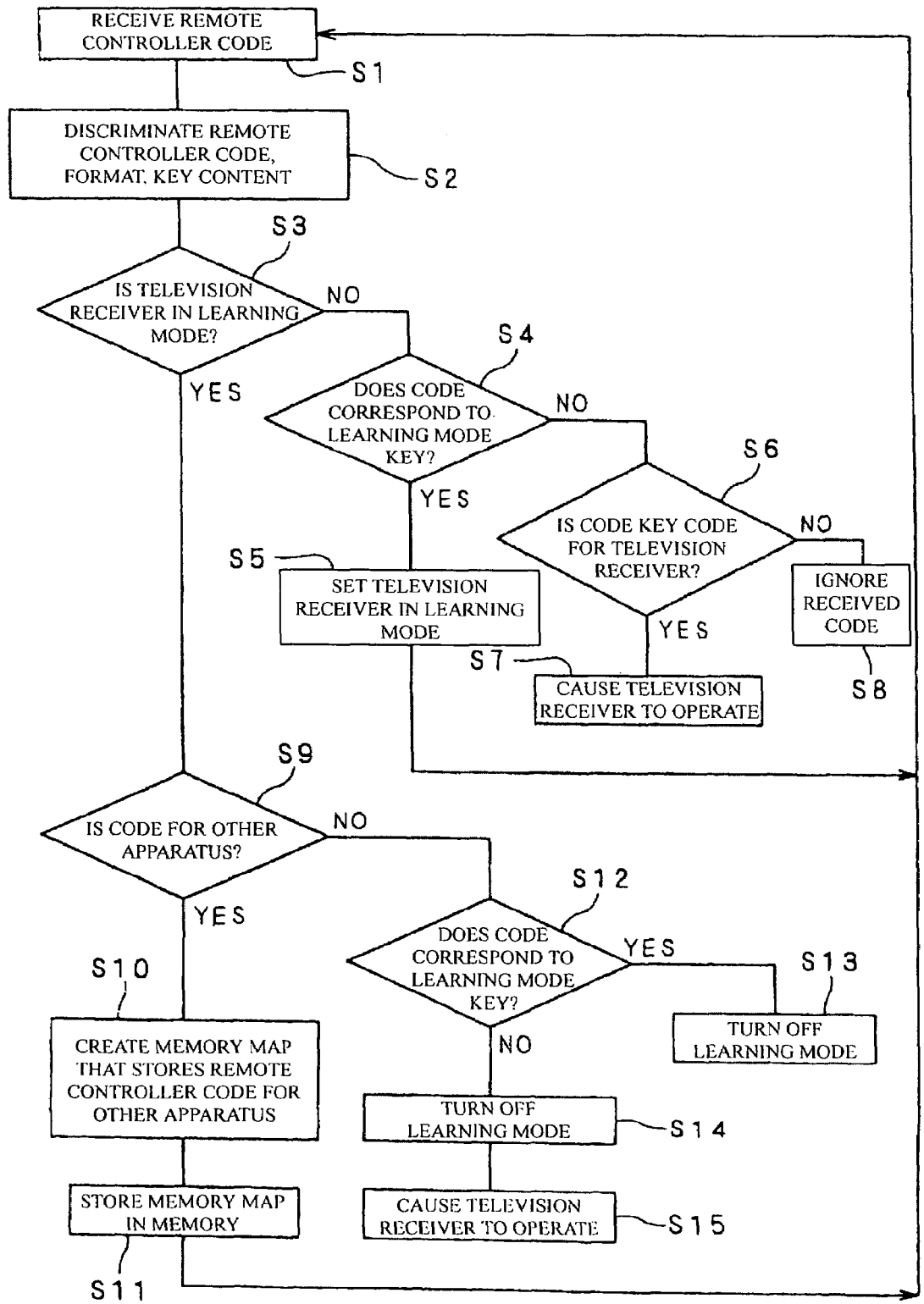

[Fig. 6]
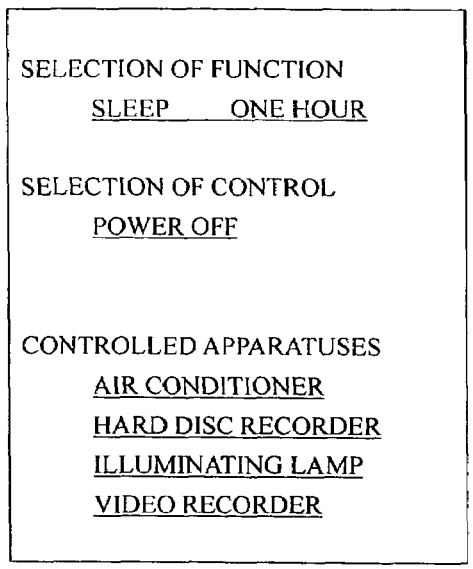
SELECTION OF FUNCTION
    SLEEP    ONE HOUR
SELECTION OF CONTROL
    POWER OFF
CONTROLLED APPARATUSES
    AIR CONDITIONER
    HARD DISC RECORDER
    ILLUMINATING LAMP
    VIDEO RECORDER
SELECTION OF FUNCTION
{ ON TIMER    AM 7:00
  OFF TIMER    PM 10:00
  REPRODUCTION
    AND THE LIKE ARE ALSO SELECTABLE
SELECTION OF CONTROL
{ POWER ON
  REPRODUCTION
    AND THE LIKE ARE ALSO SELECTABLE

[Fig. 7]

SELECTION OF FUNCTION

SLEEP

| 1 HOUR |
|---|
| 10 MINUTES |
| 20 MINUTES |
| • |
| • |
| • |

| ON TIMER |
|---|
| OFF TIMER |
| REPRODUCTION |
| RECORDING |
| POWER ON |
| • |
| • |
| • |

SELECTION OF CONTROL

POWER OFF

| POWER ON |
|---|
| REPRODUCTION |
| RECORDING |
| • |
| • |
| • |

[Fig. 8]
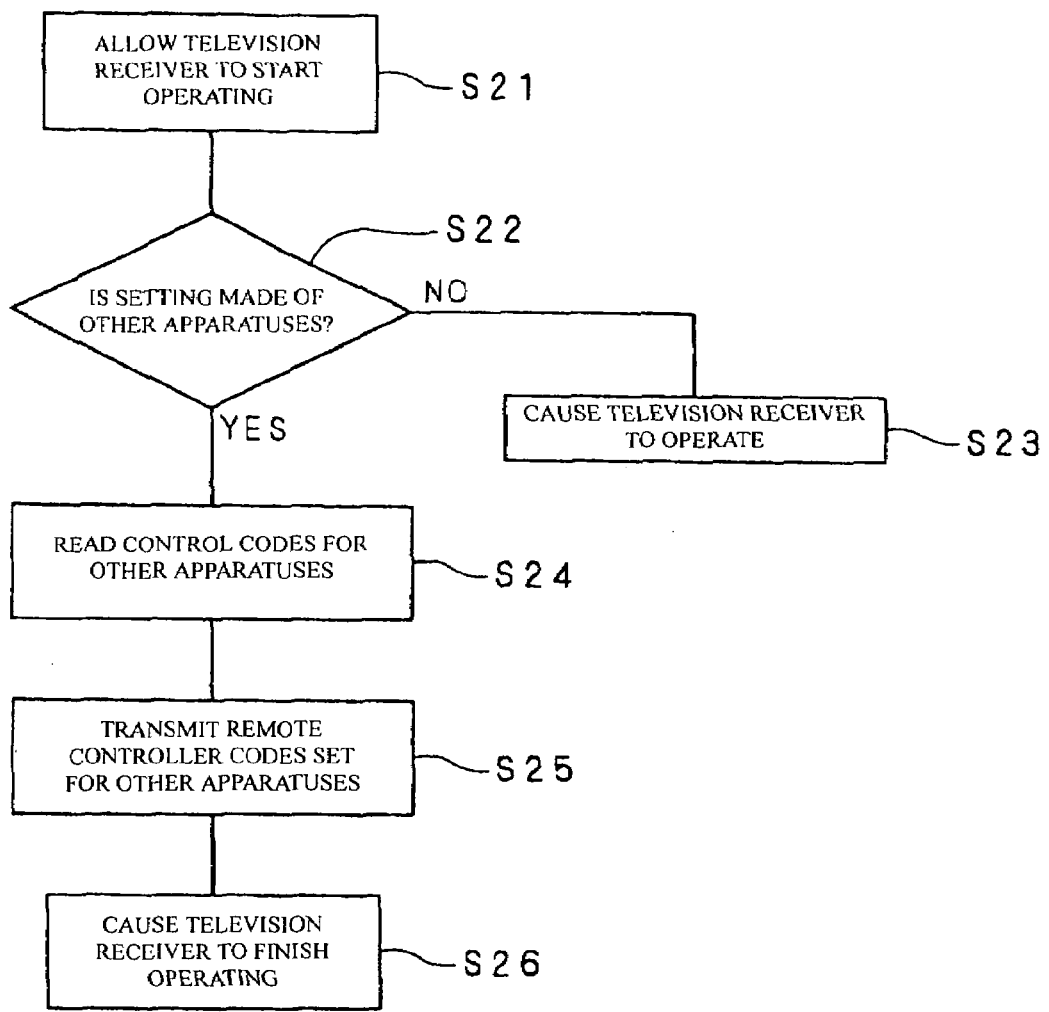

[Fig. 9]
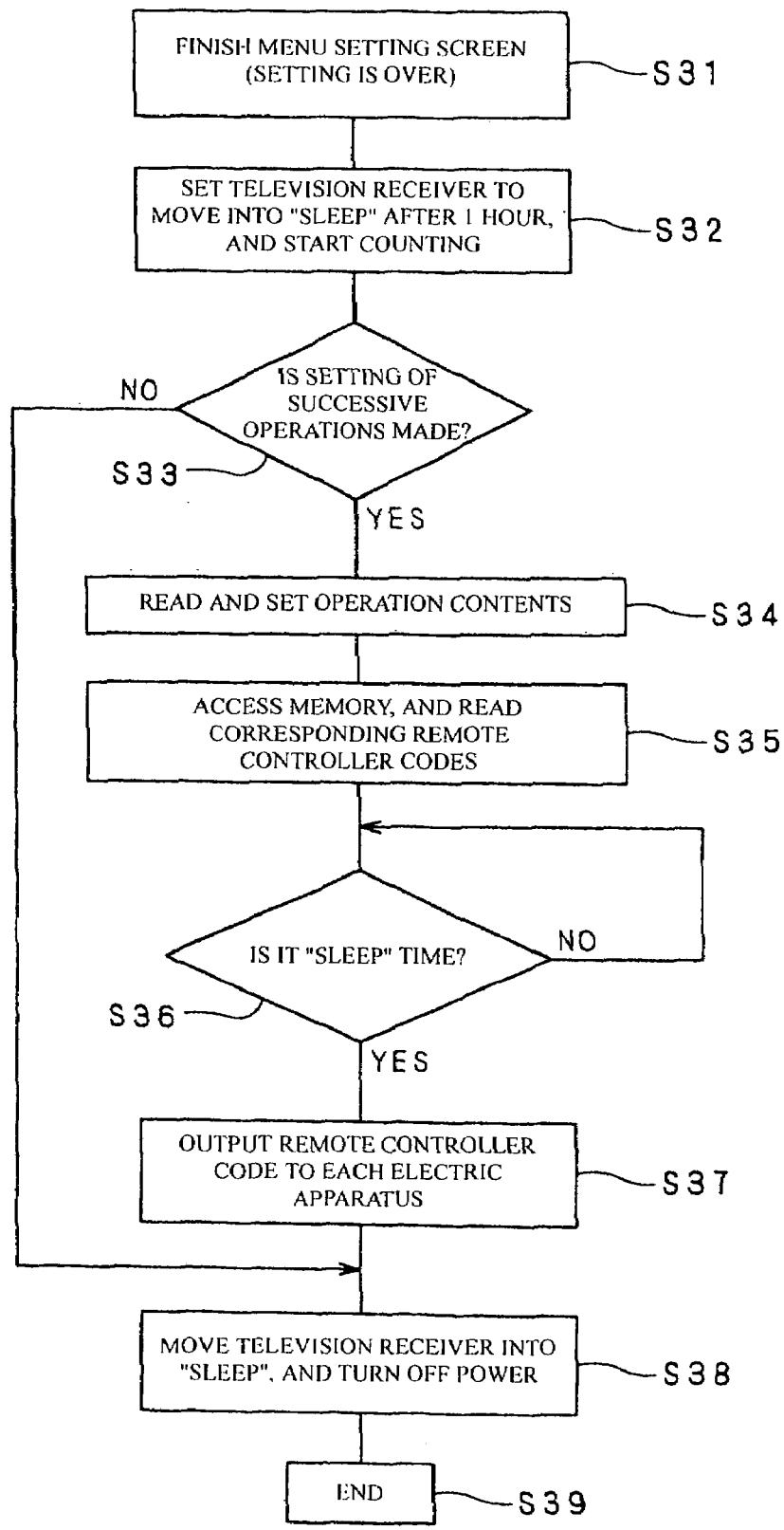

TELEVISION RECEIVER AND ELECTRIC APPARATUS CONTROL METHOD

BACKGROUND OF THE INVENTION

1. Field of the Invention

The present invention relates to a television receiver which controls electric apparatuses other than the television receiver, and a method of controlling the other electric apparatuses using the television receiver.

2. Description of the Related Art

In recent years, electric apparatuses provided in a home such as an air conditioner, a video receiver such as a television set, and an illuminating lamp are made operable by respective remote controllers. Namely, an operation of each electric apparatus is controlled by allowing a user who uses the apparatus to operate the remote controller to thereby transmit a control code by radio.

Conventionally, there is known a technique for causing a plurality of electric apparatuses controlled by respective remote controllers to operate successively with one another (see, for example, Japanese Patent Application Laid-Open No. 2002-186067).

In the conventional method of causing a plurality of electric apparatuses to operate successively, a personal computer other than the electric apparatuses is employed for control. A radio transmission unit is connected to this personal computer, and a control code is transmitted to each electric apparatus from the radio transmission unit, thereby controlling the electric apparatus.

Further, according to this conventional art, the control code for controlling each electric apparatus is acquired from a website provided by a manufacturer of the electric apparatus over the Internet.

Therefore, it is disadvantageously necessary to provide the control personal computer other than the electric apparatuses to operate, and also prepare dedicated software for acquiring the control codes for the respective electric apparatuses. As a result, an entire system is disadvantageously made large in scale and complicated.

SUMMARY OF THE INVENTION

It is an object of the present invention to provide a television receiver which enables a plurality of electric apparatuses to operate successively with an operation of the television receiver and which can be constituted simply, and a method of controlling electric apparatuses other than a television receiver using the television receiver.

According to the present invention, there is provided a television receiver comprising:

an other-apparatus-code storage section which stores a control code for an electric apparatus other than the television receiver, an operation of the other electric apparatus being controlled by transmitting the control code by radio to the other electric apparatus by a remote controller;

successive operation definition means for setting a correspondence between a specific operation of the television receiver and a specific operation of the other electric apparatus based on a specific control code stored in the other-apparatus-code storage section;

an other-apparatus-code output processing section which carries out a processing for transmitting the control code for the other electric apparatus by radio;

a successive control section which outputs the control code for the other electric apparatus made to correspond to the specific operation of the television receiver by the successive operation definition means, to the other-apparatus-code output processing section, successively with the specific operation of the television receiver;

a transmission section which transmits the control code processed by the other-apparatus-code output processing section to the other electric apparatus by radio; and a control section which controls operations of the television receiver, wherein the specific control code made to correspond to the specific operation of the television receiver by the successive operation definition means is transmitted from the transmission section successively with the specific operation of the television receiver, thereby controlling the operation of the other electric apparatus (Claim 1).

The television receiver according to the present invention can control the operation of the other electric apparatus based on the correspondence between the specific operation of the television receiver and the operation of the other electric apparatus, wherein the correspondence is defined in advance by the successive operation definition means.

In addition, the television receiver according to the present invention can control the other electric apparatus successively with the operation of the television receiver without providing another dedicated apparatus for control. It is thereby possible to exercise successive control over the television receiver and the other electric apparatus by simple apparatus constitution.

The television receiver according to the present invention can be constituted so that if a television control code other than the control code for the other electric apparatus is transmitted by radio to the television receiver by a television remote controller other than the remote controller for the other electric apparatus, the operations of the television receiver are controlled based on the transmitted television control code, and so that the television receiver has a learning function of, when the control code for the other electric apparatus is transmitted to the television receiver by the remote controller for the other electric apparatus, storing the transmitted control code in the other-apparatus-code storage section (Claim 2).

The television receiver according to the present invention can store the control code for the other electric apparatus using the learning function. It is thereby possible to facilitate storing the control code for the other electric apparatus in the television receiver, and facilitate manufacturing the television receiver of the present invention.

The television receiver according to the present invention can be constituted so that if the other electric apparatus carries out the specific operation, which differs depending on a plurality of control codes, the successive operation definition means is enabled to set a correspondence between a plurality of specific operations of the television receiver and a plurality of specific operations of the other electric apparatus (Claim 3).

The television receiver according to the present invention can exercise diversified control over the other electric apparatus by controlling a plurality of operations of the other electric apparatus by a plurality of operations of the television receiver.

Further, if a plurality of the electric apparatuses are present, the successive operation definition means is enabled to set a correspondence between the specific operations of the plurality of other electric apparatuses and one of the plurality of specific operations of the television receiver (Claim 4).

Since the television receiver according to the present invention can control a plurality of other electric apparatuses, the television receiver can control integrally many other electric apparatuses.

Moreover, according to the present invention, there is provided an electric apparatus control method of controlling an electric apparatus other than a television receiver using the television receiver, wherein an operation of the other electric apparatus is controlled based on a control code transmitted to the other electric apparatus from a remote controller by radio, the television receiver stores a television control code transmitted by a television remote controller by radio, an operation of the television receiver being controlled based on the television control code, has a learning function of storing the control code for the other electric apparatus, and comprises: an other-apparatus-code output processing section which carries out a processing for transmitting the stored control code by radio; and a transmission section which transmits the control code to the other electric apparatus by radio, and wherein the method comprises:

a control code learning step of transmitting the control code for the other electric apparatus by the remote controller for the other electric apparatus, and of storing the control code in the television receiver;

a successive operation definition step of defining a correspondence between a specific operation of the television receiver and a specific operation of the other electric apparatus based on a specific control code, and of storing the correspondence in the television receiver; and a control code transmission step of carrying out a processing for transmitting by radio the specific control code for the other electric apparatus made to correspond to the specific operation of the television receiver in the successive operation definition step, successively with the specific operation of the television receiver, and of transmitting the processed specific control code from the transmission section of the television receiver to the other electric apparatus (Claim 5).

With the electric apparatus control method according to the present invention, the television receiver can control the operation of the other electric apparatus successively with the operation of the television receiver.

According to the present invention, it is thereby possible to control the operation of the other electric apparatus by the television receiver. It is, therefore, unnecessary to provide another dedicated apparatus for control. As a result, successive control over the television receiver and the other electric apparatus can be exercised by simple apparatus constitution.

BRIEF DESCRIPTION OF THE DRAWINGS

FIG. 1 depicts a television receiver according to one embodiment of the present invention and other electric apparatuses controlled by this television receiver;

FIG. 2 is a block diagram of the television receiver;

FIG. 3 depicts a memory map which is stored in the television receiver, and which indicates control codes for the other electric apparatuses;

FIG. 4 depicts a state of storing the control codes for the other electric apparatuses in the television receiver;

FIG. 5 is a flowchart which shows procedures for storing the control codes for the other electric apparatuses in the television receiver;

FIG. 6 depicts a specific example of inputting items using a successive operation definition menu;

FIG. 7 depicts one example of a method of inputting an operation of the television receiver and operations of the other electric apparatuses using the successive operation definition menu;

FIG. 8 is a flowchart which shows procedures for ordinary operations of the television receiver; and FIG. 9 is a flowchart which shows one example of procedures for controlling the operations of the other electric apparatuses by a specific operation of the television receiver.

DETAILED DESCRIPTION OF THE PREFERRED EMBODIMENTS

Embodiments of the present invention will be described hereinafter with reference to FIGS. 1 to 9. An electric apparatus control method according to one embodiment of the present invention can be implemented using a television receiver 1 and other electric apparatuses to be described below.

FIG. 1 depicts the television receiver 1 according to one embodiment of the present invention and a plurality of electric apparatuses other than the television receiver 1 controlled successively with an operation of the television receiver 1. Specifically, FIG. 1 depicts the television receiver 1 installed in one room such as a room in a home, an illuminating lamp 31, an air conditioner 32, a hard disc recorder 33, a digital versatile disc ("DVD") recording and reproduction apparatus 34.

The illuminating lamp 31, the air conditioner 32, the hard disc recorder 33, and the DVD recording and reproduction apparatus 34 shown in FIG. 1 are allowed to operate by causing a user who uses these other electric apparatuses to operate respective dedicated remote controllers.

Namely, when the user operates one dedicated remote controller to thereby transmit a control code to one electric apparatus by radio, the electric apparatus is controlled based on the transmitted control code. These other electric apparatuses include reception sections for receiving transmitted waves including the corresponding control codes, respectively.

The television receiver 1 is allowed to operate by causing the user who uses the television receiver 1 to operate a television remote controller. Specifically, when the user operates the television remote controller to thereby transmit a television control code to the television receiver 1 by radio, the television receiver 1 is controlled based on the transmitted television control code.

A main body of the television receiver 1 includes a reception section 2, a transmission section 3, and a television screen 4. The reception section 2 receives the television control code transmitted from the television remote controller by radio. The reception section 2 also receives control codes for the other electric apparatuses transmitted from their respective remote controllers by radio. The transmission section 3 transmits the control codes for the other electric apparatuses to the apparatuses, respectively.

The television screen 4 outputs a video having a content of a broadcast on a television channel received by the television receiver 1. On the television screen 4, a successive operation definition menu, to be described later, and a control code memory map which indicates the control codes of the remote controllers stored in the television receiver 1 are displayed.

The configuration of the television receiver 1 will next be described. FIG. 2 is a block diagram of the television receiver 1 related to control of the television receiver 1. As shown in FIG. 2, the television receiver 1 includes a control section 10, a code discrimination section 14, an other-apparatus-code storage section 15, an other-apparatus-code read section 16, and an other-apparatus-code output processing section 17. The control section 10 includes a main body functional control section 11, a successive control section 12, and a processing section 13.

The main body functional control section 11 in the control section 10 controls overall operations of the television receiver 1.

An operation command signal which represents a content of an operation for the television remote controller is input to the main body functional control section 11 from the processing section 13 to be described later. The main body functional section 11 controls the operation of the television receiver 1 based on the input operation command signal.

Further, the main body functional control section 11 carries out processings for outputting the content of the broadcast on a broadcast channel received by an antenna and a tuner, which are not shown, to the television screen 4 and a loudspeaker, which is not shown.

Namely, the main body functional control section 11 carries out a video signal processing for outputting the video to the television screen 4, and a voice signal processing for outputting a voice to the loudspeaker, not shown, based on the received broadcast signal on the broadcast channel.

If the user of the television receiver 1 operates a reception channel selection key of the television remote controller and selects a broadcast channel a broadcast on which the user wants to view and listen to, the selected channel is set into the main body functional control section 11. The main body functional control section 11 controls the tuner to receive the broadcast on the selected channel.

The successive control section 12 included in the control section 10 controls the other electric apparatuses to operate successively with the operation of the television receiver 1. The successive control section 12 is controlled by the main body functional control section 11.

The control codes for the other electric apparatuses are input to the successive control section 12 from the other-apparatus-code read section 16 to be described later. In addition, data which represents a correspondence between a specific operation of the television receiver 1 and the control codes for the other electric apparatuses set by the successive operation definition menu, to be described later, is input to the successive control section 12.

The successive control section 12 discriminates the operation of the television receiver 1 based on an operation specifying signal that represents a content of the operation of the television receiver 1 input from the main body functional control section 11.

Further, the successive control section 12 outputs the control codes for the other electric apparatuses that are made to correspond to this specific operation of the television receiver 1 by the successive operation definition menu, successively with the specific operation of the television receiver 1.

The processing section 13 processes the television control code input from the code discrimination section 14 to be described later. This television control code is transmitted from the television remote controller in accordance with the content of the operation for the television remote controller. The processing section 13 converts the input television control code into an operation command signal that represents a content of a corresponding operation, and outputs the operation command signal to the main body functional control section 11.

The code discrimination section 14 carries out a control code discrimination processing for discriminating whether the input control code is a television control code or a control code for the other electric apparatus. The television control code or the control code for the other electric apparatus is input to the code discrimination section 14 from the reception section 2.

If the code discrimination section 14 discriminates that the input control code is the television control code, the code discrimination section 14 outputs this control code to the processing section 13. If discriminating that the input control code is the control code for the other electric apparatus, the code discrimination section 14 outputs this control code to the other-apparatus-code storage section 15.

The other-apparatus-code storage section 15 stores the control code for the other electric apparatus input from the code discrimination section 14. FIG. 3 depicts one example of a control code memory map which is stored in the other-apparatus-code storage section 15, and which represents a correspondence between the other electric apparatuses and control codes.

The control code memory map shown in FIG. 3 stores the control codes for the other electric apparatuses, i.e., a first air conditioner, a second air conditioner, a hard disc, and an illuminating lamp. Specifically, the control code memory map stores apparatus control codes corresponding to the respective electric apparatuses, and operation control codes corresponding to each operation of the respective electric apparatuses.

As for the first air conditioner shown in FIG. 3, for example, "20H" is stored as the control code for specifying the first air conditioner, and "7A" is stored as the control code that represents an operation of turning on the power to the first air conditioner.

The other-apparatus-code read section 16 shown in FIG. 2 carries out a processing for reading the control codes for the other electric apparatuses that are made to correspond to the specific operation of the television receiver 1 by the successive operation definition menu to be described later. The other-apparatus-code read section 16 reads the control codes from the other-apparatus-code storage section 15 and outputs the control codes to the successive control section 12.

The other-apparatus-code output processing section 17 performs a processing for transmitting the control codes for the other electric apparatuses by radio. If a control code for the other electric apparatus is input to the other-apparatus-code output processing section 17 from the successive control section 12, then the other-apparatus-code output processing section 17 processes the input control code, and outputs the processed control code to the transmission section 3.

The control section 10, the other-apparatus-code read section 16, and the other-apparatus-code output processing section 17 shown in FIG. 2 are constituted by a microcomputer that includes a read-only memory ("ROM") and random-access memory ("RAM"). Each section shown in FIG. 2 is modularized by an arithmetic program which is stored in the ROM of the microcomputer.

The ROM of the microcomputer also stores an input operation control program for displaying various operation menus on the television screen 4, and for reading operation conditions input by the user based on a displayed operation menu. The successive operation definition menu, to be described later, is displayed on the television screen 4 under control of this input operation control program. Likewise, a content set based on the display of the successive operation definition menu is read into the control section 10 under control of the input operation control program.

The ROM of the microcomputer further stores other control programs necessary to control the operations of the television receiver 1.

The television receiver 1 has a learning function of storing the control codes for the other electric apparatuses that are transmitted by the remote controllers for the other electric apparatuses by radio. Based on this learning function, the television receiver 1 can store the control codes for the other electric apparatuses in the other-apparatus-code storage section 15.

Further, the television receiver 1 includes recording and reproduction means, which is not shown in the drawings. As the recording and reproduction means included in the television receiver 1, a videotape recorder (VTR) using a videotape as a recording medium or a DVD recording and reproduction means using a digital versatile disk (DVD) as a recording medium can be provided.

The television remote controller for operating the television receiver 1 is equipped with a power key for turning on and off the power to the television receiver 1, a channel select key for selecting a reception channel, and a learning key LK to be described later.

The television remote controller is also equipped with a successive operation definition menu display key for displaying the successive operation definition menu, to be described later, on the television screen 4. A part of the operation keys on the television remote controller is allocated as a successive operation definition input key for inputting items to the successive operation definition menu.

By operating the successive operation definition input key while displaying the successive operation definition menu on the television screen 4, the correspondence between the operation of the television receiver 1 and those of the other electric apparatuses can be set.

Referring next to FIGS. 4 and 5, an example of procedures for storing the control codes for the other electric apparatuses in the television receiver 1 will be described.

If the control codes for the other electric apparatuses are to be stored in the television receiver 1, the learning key LK on a television remote controller RMT shown in FIG. 4 is operated. By doing so, the television receiver 1 is set in a learning mode for storing control codes.

By operating a remote controller RM1 or RM2 for one of the other electric apparatus, the control codes for the other electric apparatuses to be stored in the television receiver 1 are transmitted to the television receiver 1. The transmitted control codes for the other electric apparatus are received by the reception section 2 in the television receiver 1, and input to the other-apparatus-code storage section 15.

Alternatively, the control codes for the other electric apparatus can be stored in the television receiver 1 according to the following procedures. By operating the learning key LK on the television remote controller RMT, the television receiver 1 is set in the learning mode. The other remote controller RM1 or RM2 is arranged to face the television remote controller RMT, and the control codes for the other electric apparatus are transmitted from the other remote controller RM1 or RM2 to the television remote controller RMT.

The television remote controller RMT for the television receiver 1 set in the learning mode receives the control codes for the other electric apparatus. The control codes for the other electric apparatus received by the television remote controller RMT are transmitted to the television receiver 1. The control codes for the other electric apparatus transmitted to the television receiver 1 are received by the reception section 2 of the television receiver 1, and input to the other-apparatus-code storage section 15.

The operation of the television receiver 1 for the operation of the television remote controller RMT and the remote controllers RM1 and RM2 for the other electric apparatuses will next be described with reference to FIG. 5. FIG. 5 is a flowchart which shows one example of procedures for causing the television receiver 1 to operate.

If the reception section 2 of the television receiver 1 receives a remote controller code (control code) transmitted from a certain remote controller (in a step S1), the television receiver 1 discriminates the remote controller code, a format of the code, and a content of an operated remote controller key (in a step S2).

It is then detected whether the television receiver 1 is in a learning mode (in a step S3). If the television receiver 1 is not in the learning mode ("NO" in the step S3), and if the remote controller code received in the step S1 corresponds to the learning mode key LK of the television remote controller RMT ("YES" in a step S4), then the television receiver 1 is set in the learning mode (in a step S5), and procedures after the step S1 are executed.

If the remote controller code received in the step S1 does not correspond to the learning mode key LK ("NO" in the step S4), but corresponds to the other operation key of the television remote controller RMT ("YES" in a step S6), the television receiver 1 is caused to operate to correspond to this operation key (in a step S7).

If the remote controller code received in the step S1 does not correspond to the learning mode key LK ("NO" in the step S4), and does not correspond to the other operation key of the television remote controller RMT ("NO" in the step S6), then the television receiver 1 ignores the received remote controller code (in a step S8).

If it is detected in the step S3 that the television receiver 1 is in the learning mode ("YES" in the step S3), and if the remote controller code transmitted in the step S1 is the remote controller code for the other apparatus (the other electric apparatus) ("YES" in a step S9), then a memory map that stores the remote controller code for the other apparatus is created (in a step S10) and stored in the memory (the other-apparatus-code storage section 15) (in a step S11). The procedures after the step S1 are then executed.

If it is detected in the step S3 that the television receiver 1 is in the learning mode ("YES" in the step S3), and if the remote controller code transmitted in the step S1 is not the code for the other electric apparatus ("NO" in a step S9) but the code corresponds to the learning mode key LK of the remote controller RMT ("YES" in a step S12), then the learning mode is turned off (in a step S13).

If it is detected in the step S3 that the television receiver 1 is in the learning mode ("YES" in the step S3), and if the remote controller code transmitted in the step S1 is not the code for the other apparatus (the other electric apparatus) ("NO" in the step S9), and the code does not correspond to the learning mode key LK of the remote controller RMT ("NO" in the step S12), then the learning mode is turned off (in a step S14) and the television receiver 1 is caused to operate (in a step S15).

As for the television receiver 1, an arbitrary method of transmitting the television control code from the television remote controller RMT can be adopted as long as the method enables transmitting the television control code by radio.

Examples of the transmission method include a method of transmitting the television control code over a microwave, and a method of transmitting the television control code over an infrared ray.

As for the other electric apparatuses, an arbitrary method of transmitting the control codes for the other electric apparatuses by their respective remote controllers can be adopted as long as the method enables transmitting the control codes by radio. Examples of the method of transmitting the control codes for the other electric apparatuses include a method of transmitting the control codes over a microwave, and a method of transmitting the control codes over an infrared ray.

The successive operation definition menu will next be described with reference to FIGS. 6 and 7. FIG. 6 depicts one example of the successive operation definition menu displayed on the television screen 4 of the television receiver 1.

The successive operation definition menu is an input operation menu for setting the correspondence between the specific operation of the television receiver 1 and the operations of the other electric apparatuses controlled successively with the specific operation of the television receiver 1. The successive operation definition menu can be displayed on the television screen 4 by operating the successive operation definition menu display key on the television remote controller.

As shown in FIG. 6, "SELECTION OF FUNCTION", "SELECTION OF CONTROL", and "CONTROLLED APPARATUSES" are displayed as items set by the successive operation definition menu. The "SELECTION OF FUNCTION" is the item for setting the operation of the television receiver 1. The "SELECTION OF CONTROL" is the item for setting the operations of the other electric apparatuses controlled successively with the operation of the television receiver 1. The "CONTROLLED APPARATUSES" is the item for setting the other electric apparatuses to be controlled.

In the example of FIG. 6, the television receiver 1 is set to turn into a sleep mode after one hour by the "SELECTION OF FUNCTION", the power to the other electric apparatuses are set to be turned off by the "SELECTION OF CONTROL", and the air conditioner, the hard disc, the illuminating lamp, and the videotape recorder are set as the "CONTROLLED APPARATUSES".

In the example of FIG. 6, the operation of the television receiver 1 for turning the television receiver 1 into the sleep mode for one hour and the operations of the other electric apparatuses, i.e., the air conditioner, the hard disc, the illuminating lamp, and the videotape recorder for turning off the powers to the respective apparatuses are set to be carried out successively with one another.

As shown in FIG. 6, other specific examples of the setting made by the "SELECTION OF FUNCTION" item include a setting of causing the television receiver 1 to perform an on-timer operation at seven in the morning ("ON TIMER AM7:00"), and a setting of causing the television receiver 1 to perform an off-timer operation at ten in the afternoon ("OFF TIMER PM10:00").

The on-timer operation is an operation for turning on the power at a preset time. The off-timer operation is an operation for turning off the power at a preset time.

Further, as shown in FIG. 6, a reproduction operation ("REPRODUCTION") of the recording and reproduction means included in the television receiver 1 can be set by the "SELECTION OF FUNCTION" item.

As shown in FIG. 6, the "SELECTION OF CONTROL" item enables making a setting of turning on the power to the other electric apparatuses ("POWER ON"), and a setting of a reproduction operation of the hard disc recorder or the videotape recorder ("REPRODUCTION").

Further, all the other electric apparatuses the control codes for which are stored in the other-apparatus-code storage section 15 can be displayed in a block of "CONTROLLED APPARATUSES" on the successive operation definition menu. From among a plurality of other electric apparatuses displayed in the block of "CONTROLLED APPARATUSES", one arbitrary apparatus to operate successively with the operation of the television receiver 1 can be selected. Besides, from among the other electric apparatuses displayed in the block of "CONTROLLED APPARATUS", a plurality of electric apparatuses can be selected.

Settings of the "SELECTION OF FUNCTION" item and the "SELECTION OF CONTROL" item will next be described with reference to FIG. 7. FIG. 7 depicts one example of the display of the television screen 4 in relation to the settings of the "SELECTION OF FUNCTION" item and the "SELECTION OF CONTROL" item on the successive operation definition menu.

On the successive operation definition menu shown in FIG. 7, the sleep mode ("SLEEP"), and one hour, ten minutes, twenty minutes, etc. as time after which the television receiver 1 moves into the sleep mode are displayed in relation to the "SELECTION OF FUNCTION" item. In addition, on the successive operation definition menu shown in FIG. 7, "ON TIMER", "OFF TIMER", "REPRODUCTION", "RECORDING", "POWER ON", etc. are displayed in relation to the "SELECTION OF FUNCTION" item. By selecting one item from among those displayed in relation to the "SELECTION OF FUNCTION" item, the function can be set as the operation of the television receiver 1.

Further, on the successive operation definition menu shown in FIG. 7, "POWER ON", "REPRODUCTION", "RECORDING", etc. are displayed in relation to the "SELECTION OF CONTROL" item. By selecting item from among those displayed in relation to the "SELECTION OF CONTROL" item, the item can be set as the operations of the other electric apparatuses.

If a plurality of operations of the television receiver 1 are defined as those for controlling the other electric apparatuses, and a plurality of operations of the other electric apparatuses are defined as controlled operations on the successive operation definition menu stated so far, then it is possible to exercise diversified control over the other electric apparatuses by the plural operations of the television receiver 1.

If a plurality of other electric apparatuses are defined as the controlled other electric apparatuses on the successive operation definition menu, many electric apparatuses other than the television receiver 1 can be integrally controlled by the television receiver 1.

An example of the operations of the television receiver 1 stated above will next be described with reference to FIGS. 8 and 9. FIG. 8 is a flowchart which shows one example of procedures for causing the television receiver to operate, i.e., a flowchart for ordinary operations of the television receiver 1.

The power to the television receiver 1 is turned on, thereby allowing the television receiver 1 to start operating (in a step S21). Then it is determined whether a setting is made of the other apparatuses (other electric apparatuses) controlled successively with the operation of the television receiver 1 (in a step S22).

If no setting is made of the other apparatuses controlled successively with the operation of the television receiver 1 ("NO" in the step S22), only the television receiver 1 is caused to operate (in a step S23). If the setting is made of the other apparatuses controlled successively with the operation of the television receiver 1 ("YES" in the step S22), the control codes for the other apparatuses stored in the other-apparatus-code storage section 15 are read (in a step S24).

The television receiver 1 transmits the set control codes for the other apparatuses, that is, the control codes for the other apparatuses set to correspond to the specific operation of the television receiver 1 by the successive operation definition menu (in a step S25). As a result, the corresponding other electric apparatuses, to which the television receiver 1 transmits the control codes, operate based on the settings made by the successive operation definition menu. The television receiver 1 then finishes operating (in a step S26).

A more specific example of the operation of the television receiver 1 will be described with reference to FIG. 9. FIG. 9 is a flowchart which shows one example of procedures for controlling the operations of the other electric apparatuses successively with the specific operation of the television receiver 1. Specifically, FIG. 9 is a flowchart for controlling the other electric apparatuses successively with the operation of the television receiver 1 for moving into the sleep mode.

First, the power to the television receiver 1 is turned on, thereby causing the television receiver 1 to start operating. The successive operation definition menu is displayed on the television screen 4, and a setting is made of the correspondence between the operation of the television receiver 1 for moving into the sleep mode and the operations of the other electric apparatuses.

When the input of the correspondence between the operation of the television receiver 1 and the operations of the other electric apparatuses by the successive operation definition menu is finished, the menu setting screen is finished (in a step S31). Next, if the television receiver 1 is set to move into the sleep mode ("SLEEP") after one hour by user's operation, counting of the set time starts (in a step S32).

It is determined whether a setting is made of successive operations of the other electric apparatuses controlled successively with the operation of the television receiver 1 (in a step S33). If the successive operations are set by the successive operation definition menu ("YES" in the step S33), then the television receiver 1 reads operation contents input through the successive operation definition menu, and sets the input correspondence between the operation of the television receiver 1 and the operations of the other electric apparatuses into the successive control section 12 (in a step S34).

The other-apparatus-code storage section 15 is then memory accessed, and the remote controller codes (control codes) for the other electric apparatuses corresponding to the operation of the television receiver 1 for moving into the sleep mode after one hour are read from the other-apparatus-code storage section 15 into the successive control section 12 (in a step S35).

The television receiver 1 waits until the time of the sleep ("SLEEP") set in the step S32 ("NO" in a step S36). At the set sleep time ("YES" in the step S36), the television receiver 1 outputs the remote controller codes (control codes) to the respective electric apparatuses (in a step S37). In addition, the television receiver 1 moves into the sleep mode, the power is turned off (in a step S38), and the television receiver 1 finishes operating (in a step S39).

If it is determined in the step S33 that no setting is made of the successive operations of the other electric apparatuses by the successive operation definition menu ("NO" in the step S33), then the television receiver 1 moves into the sleep mode ("SLEEP"), the power is turned off (in the step S38), and the television receiver 1 finishes operating (in the step S39).

As stated so far, according to the present invention, the television receiver can control the operations of the other electric apparatuses successively with the operation of the television receiver. Since the television receiver can control the operations of the other electric apparatuses, it is unnecessary to provide other dedicated control-related apparatuses, and successive control over the television receiver and the other electric apparatuses can be realized with the simple constitution of apparatuses.

What is claimed is:

1. A television receiver comprising:

an other-apparatus-code storage section which stores a control code for an electric apparatus other than the television receiver, an operation of the other electric apparatus being controlled by transmitting the control code by radio to the other electric apparatus by a remote controller;

successive operation definition means for setting a conditional correspondence, as defined by a user, between a specific operation of the television receiver and a specific operation of the other electric apparatus controlled by a specific control code stored in the other-apparatus-code storage section, said specific operation is independently executed by the television receiver or the other electric apparatus without being conditioned upon each other but for the conditional correspondence;

an other-apparatus-code output processing section which carries out a processing for transmitting the control code for the other electric apparatus by radio;

a successive control section which outputs the specific control code for the other electric apparatus corresponding to the specific operation of the television receiver as defined via the successive operation definition means by the user, to the other-apparatus-code output processing section, successively with the specific operation of the television receiver;

a transmission section which transmits the specific control code after processed by the other-apparatus-code output processing section to the other electric apparatus by radio; and a control section which controls operations of the television receiver, wherein the specific control code corresponding to the specific operation of the television receiver defined via the successive operation definition means is transmitted from the transmission section successively with the specific operation of the television receiver, thereby controlling said specific operation of the other electric apparatus.

2. The television receiver according to claim 1, wherein if a television control code other than the control code for the other electric apparatus is transmitted by radio to the television receiver by a television remote controller other than the remote controller for the other electric apparatus, the operations of the television receiver are controlled based on the transmitted television control code, and the television receiver has a learning function of, when the control code for the other electric apparatus is transmitted to the television receiver by the remote controller for the other electric apparatus, storing the transmitted control code in the other-apparatus-code storage section.

3. The television receiver according to claim 2, wherein the other electric apparatus carries out the specific operation, which differs depending on a plurality of control codes, and
the successive operation definition means is set with a correspondence, as defined by the user, between a plurality of specific operations of the television receiver and a plurality of specific operations of the other electric apparatus.

4. The television receiver according to claim 1, wherein the other electric apparatus carries out the specific operation, which differs depending on a plurality of control codes, and
the successive operation definition means is set with a correspondence, as defined by the user, between a plurality of specific operations of the television receiver and a plurality of specific operations of the other electric apparatus.

5. The television receiver according to claim 4, wherein a plurality of the electric apparatuses are present, and
the successive operation definition means is set with a correspondence, as defined by the user, between the specific operations of the plurality of other electric apparatuses and one of the plurality of specific operations of the television receiver.

6. An electric apparatus control method of controlling an electric apparatus other than a television receiver using the television receiver,
comprising:
transmitting a control code for the other eleetric apparatus by a remote controller by radio to the television receiver, and storing the control code in the television receiver;
setting and storing in the television receiver a conditional correspondence, as defined by a user, between a specific operation of the television receiver and a specific operation of the other electric apparatus controlled by a specific control code, said specific operation being independently executed by the television receiver or the other electric apparatus without being conditioned upon each other but for the conditional correspondence; and
transmitting by radio the specific control code to the other electric apparatus corresponding to the specific operation of the television receiver as defined by the user, successively with the specific operation of the television receiver, thereby controlling said specific operation of the other electric apparatus.

7. The television receiver according to claim 3, wherein a plurality of the electric apparatuses are present, and
the successive operation definition means is set with a correspondence, as defined by the user, between the specific operations of the plurality of other electric apparatuses and one of the plurality of specific operations of the television receiver.

* * * * *